United States Patent [19]

Bolliger et al.

[11] Patent Number: 5,226,071
[45] Date of Patent: Jul. 6, 1993

[54] CALL PATH RESOURCE ALLOCATION IN A WIRELESS TELECOMMUNICATIONS SYSTEM

[75] Inventors: Brian D. Bolliger, Winfield; Charalambos G. Constantinides, Chicago; Steven L. Stevens, Lisle, all of Ill.

[73] Assignee: AT&T Bell Laboratories, Murray Hill, N.J.

[21] Appl. No.: 629,522

[22] Filed: Dec. 18, 1990

[51] Int. Cl.⁵ .......................................... H04M 11/00
[52] U.S. Cl. ...................................... 379/60; 379/59; 455/33.2
[58] Field of Search .................. 379/59, 60, 63, 266, 379/309; 455/33, 56, 33.1, 33.2, 56.1

[56] References Cited

U.S. PATENT DOCUMENTS

| Re. 32,789 | 11/1988 | Lynk, Jr. et al. | 379/58 |
|---|---|---|---|
| 2,922,847 | 1/1960 | Dunning | 179/27 |
| 3,297,829 | 1/1967 | Germanton | 179/27 |
| 3,663,762 | 5/1972 | Joel, Jr. | |
| 3,898,390 | 8/1975 | Wells et al. | 455/33 X |
| 4,048,452 | 9/1977 | Oehring et al. | 179/27 |
| 4,654,867 | 3/1987 | Labedz et al | 379/60 X |
| 4,737,978 | 5/1988 | Bucke et al. | 379/60 |
| 4,827,499 | 5/1989 | Warty et al. | 379/58 |
| 4,879,740 | 11/1989 | Nagashima et al. | 379/60 X |
| 4,953,204 | 8/1990 | Cuschleg, Jr. et al. | 379/266 |
| 4,977,589 | 12/1990 | Johnson et al. | 379/58 |
| 5,020,095 | 5/1991 | Morganstein et al. | 379/266 X |

OTHER PUBLICATIONS

Switching Products (235-390-500) *5ESS TM Switch Feature Handbook*, pp. 18, 29, 41.

*Primary Examiner*—Curtis Kuntz
*Assistant Examiner*—G. J. Oehling
*Attorney, Agent, or Firm*—W. Ulrich; M. B. Johannesen

[57] ABSTRACT

A wireless telecommunications system where call path resources are allocated in an orderly manner by queuing call requests during, for example, radio channel unavailability, and assigning radio channels to queued call requests as they become available. To accomodate movement of the mobile station within the service area, a plurality of queues are provided for different locations and a call request is sequentially placed in different queues as the mobile station moves. The system is usable for both incoming and outgoing calls.

29 Claims, 9 Drawing Sheets

| MOBILE ID NO. | PRIORITY LEVEL | CALL MODE | CELL SEGMENTS |
|---|---|---|---|
| . | . | . | . |
| . | . | . | . |
| . | . | . | . |
| . | . | . | . |
| . | . | . | . |
| . | . | . | . |
| . | . | . | . |

FIG. 3
PRIOR ART
MOBILE ORIGINATION
(WITH CHANNELS AVAILABLE)

| MOBILE STATION (MS) | MESSAGE | WCS |
|---|---|---|
| USER ENTERS DIGITS AND DEPRESSES THE SEND KEY | ORIGINATION MESSAGE → | MS IS VALIDATED AND VOICE CHANNEL SELECTED<br><br>MSC RETURNS VOICE CHANNEL ASSIGNMENT TO MS AND ESTABLISHED CALL TO CALLED PARTY |
| MS TUNES TO VOICE CHANNEL AND SENDS ACKNOWLEDGMENT | ← COMMUNICATION CHANNEL ASSIGNMENT | |
| | COMMUNICATION CHANNEL CONFIRMATION → | |

FIG. 4
PRIOR ART
MOBILE ORIGINATION
(NO CHANNELS AVAILABLE)

| MOBILE STATION (MS) | MESSAGE | WCS |
|---|---|---|
| USER ENTERS DIGITS AND DEPRESSES THE SEND KEY | ORIGINATION MESSAGE → | MS IS VALIDATED AND COMMUNICATION CHANNEL SELECTED<br><br>NO CHANNELS AVAILABLE SO WCS RETURNS REORDER TO THE MS |
| | ← REORDER | |

FIG. 5
PRIORITY MOBILE ORIGINATION
(NO CHANNELS AVAILABLE)

FIG. 6

FIG. 7
PRIORITY MOBILE ORIGINATION
(NO CHANNELS AVAILABLE)

| MOBILE STATION (MS) | MESSAGE | WCS |
|---|---|---|
| IF CHANNELS BECOME AVAILABLE IN THE ORIGINAL CELL OR THE MS MOVES TO A NEW CELL WITH CHANNELS AVAILABLE, THE FOLLOWING OCCURS: | | |
| MS RECEIVES AND RESPONDS TO PAGE | ← PAGE | QUEUED MS IS PAGED |
| | PAGE RESPONSE → | MS IS GIVEN VOICE CHANNEL ASSIGNMENT AND CALL IS ESTABLISHED TO CALLED PARTY |
| MS TUNES TO VOICE CHANNEL AND SENDS ACKNOWLEDGMENT | ← COMMUNICATION CHANNEL ASSIGNMENT | |
| | COMMUNICATION CHANNEL CONFIRMATION → | |

FIG. 9

REMOVAL OF AN MS FROM QUEUE
BY HIGHER PRIORITY MS

| MOBILE STATION (MS) | MESSAGE | WCS |
|---|---|---|
| | | WCS DETERMINES THAT A PREVIOUSLY QUEUED MS MUST BE REMOVED FROM QUEUE IN ORDER TO QUEUE A HIGHER PRIORITY MS. MS IS SENT REORDER MESSAGE |
| MS RECEIVES REORDER MESSAGE AND ALERTS USER THAT CALL IS NO LONGER QUEUED . | ← REORDER | |

NON-PRIORITY MS ATTEMPTS PRIORITY CALL

| MOBILE STATION (MS) | MESSAGE | WCS |
|---|---|---|
| USER ENTERS PRIORITY CALLING DIGITS AND DEPRESSES THE SEND KEY | ORIGINATION MESSAGE → | MS IS VALIDATED FOR THE PRIORITY CALLING FEATURE AND SYSTEM DETERMINES THAT MS DOES NOT HAVE THE PRIORITY CALLING FEATURE<br><br>WCS RETURNS INTERCEPT EVEN IF CHANNELS ARE AVAILABLE TO SERVE THE CALL |
| MS PLAYS INTERCEPT AND RETURNS TO IDLE STATE | ← INTERCEPT | |

FIG. 12

MOBILE REQUESTS REMOVAL FROM QUEUE

| MOBILE STATION (MS) | MESSAGE | WCS |
|---|---|---|
| USER ENTERS DEQUEUE DIGITS AND DEPRESSES THE SEND KEY | ORIGINATION MESSAGE → | WCS RECEIVES DEQUEUE REQUEST AND REMOVES MS FROM QUEUE. HOWEVER, SINCE NO COMMUNICATION CHANNELS EXIST NO CONFIRMATION IS GIVEN TO MS. THE USER WILL NOTICE THAT THE PERIODIC ALERT HAS STOPPED |

CALL PATH RESOURCE ALLOCATION IN A WIRELESS TELECOMMUNICATIONS SYSTEM

TECHNICAL FIELD

This invention relates to the field of wireless telecommunication systems, and, more specifically, to allocation of call path resources, e.g., radio channels or voice trunks, in such systems on a priority basis.

BACKGROUND OF THE INVENTION

The number of mobile cellular telecommunications stations has increased dramatically recently, with a resulting increase in call blockage because all radio channels linking a mobile station and a cell site are allocated to other calls. Blockage increases during peak busy hours and during major events affecting the service region (such as political/governmental events, fires and natural disasters). Blockage of cellular call attempts due to unavailable radio channels leads to two consequences which further tax the cellular system.

When a mobile station attempts to place a call, the cellular system determines the best serving cell based on the mobile station's location within the system. If cellular telephone traffic is such that all of the radio channels in the best serving cell are fully allocated to other calls, then the cellular system attempts to serve the mobile station with a radio channel from the next best serving cell. If a call is established by the next best serving cell and the mobile station does not move into that cell, then the cellular system immediately begins to attempt to hand off the call to the best serving cell, and continues to do so at five or ten second intervals until a handoff is made or the call disconnects. Successive attempts to hand off calls cause system congestion in the originally congested cell, resulting in further degradation of service.

If none of the cells can service the mobile station's call request, then the mobile station receives a "reorder" signal. In response to a recorder signal, most users press the "end" button and then immediately press the "send" button, and continue doing so until the call is completed. Since calls are served on a first-come, first-serve basis, the mobile station must be the first one to request a radio channel after it becomes available. Some mobile station manufacturers have incorporated a feature into mobile station sets that automatically performs the end-send functions until the call is completed. This "end-send syndrome" causes additional load on an already heavily loaded system because the cellular system must respond to requests for service and attempts to allocate resources.

An additional difficulty in the area of wireless communication is that a mobile station is, by its nature, capable of moving around in the wireless communication system during call set up. If there is a significant delay between the time a call is placed and the time the call is completed, the mobile station may have moved, and the channel allocated for the call may no longer be for the best serving cell. Therefore, radio channel allocation in wireless communication systems is further complicated because the mobile stations can move between the time the call request is made and the time that a radio channel becomes available.

A problem in the art, therefore, is the degradation of service that results in known wireless telecommunication systems when call requests are made repetitively during unavailability of call path resources, e.g., radio channels or voice trunks, in an attempt to be the first requester after a call path resource becomes available.

SUMMARY OF THE INVENTION

This problem is solved and a technical advance is achieved in accordance with the principles of the invention in an exemplary wireless telecommunications method and structural embodiment where call path resources are allocated in an orderly manner by queuing call requests during, for example, radio channel unavailability, and assigning radio channels as they become available to queued call requests. To accommodate movement of the mobile station within the service area, a plurality of queues are provided for different locations and a call request is sequentially placed in different queues as the mobile station moves. Illustratively, the service area is divided into a plurality of cells, each having an associated cell site transmitter/receiver. The location of the mobile station within the area is tracked by periodically sending a signal to the mobile station from all cell site transmitters, determining the station's location based on the acknowledgement of that signal as received by the cell site receivers, and, when movement of a mobile station from a first cell to a second cell is detected, removing a call request from a first queue associated with the first cell and placing the request in a second queue associated with the second cell when radio channels are unavailable in the second cell. The system is usable for queuing both incoming and outgoing calls.

A method in accordance with the invention is used in a wireless telecommunications system including a plurality of cells using radio channels for communication. The system responds to a call request from a mobile station in a first cell where radio channels are unavailable by placing the call request in a queue for the first cell. The system thereafter responds to movement of the mobile station from the first cell to a second cell where radio channels are also unavailable, by placing the call request in a queue for the second cell.

Illustratively, after the call request is placed in the queue for the first cell, the system periodically sends a signal to the mobile station, and the mobile station responds by sending an acknowledgement message to the wireless telecommunication system. Movement of the mobile station is determined by comparing the cell for which the mobile station is queued to the cell where the acknowledgement message was received. When a radio channel becomes available in the cell for which the call request is queued, the radio channel is allocated to the first entry in the queue for that cell.

Furthermore, a mobile station may have an associated priority status, and the call request is then placed in the queue for the first cell so that the call request is served in priority order. For example, after the call request is received and there are no entries available in the queue for the first cell, the priority status for the requesting mobile station is determined. The priority status for the mobile station is then compared to the priority status of the mobile stations with call requests in the queue. The system replaces a call request of a mobile station with a lower priority status with the call request of the higher priority mobile station. Alternatively, there may be a plurality of queues associated with each cell, wherein each queue has an associated priority status. A call request is then placed in a queue according to the priority status and call requests are served first from the highest priority queue, then the next highest priority queue, etc.

In an additional embodiment, each of the radio channels in a cell may serve only a region of the cell. After the call request is placed in the queue for a cell and a radio channel becomes available for that cell, the system determines the region within the cell where the first mobile station in the queue for that cell is located. The service region of the available radio channel is then determined and compared to the region where the mobile station is located. If available radio channel serves the region where the mobile station is located, the radio channel is allocated to the mobile station and the call request is removed from the queue for the cell. If the regions are not the same, the queue for the cell is traversed until an entry is reached where the mobile station is located in the region of the cell served by the available radio channel.

In a further embodiment, a method in accordance with the invention is used in a wireless telecommunications system comprising a plurality of cells that use a plurality of radio channels for communication with wireless stations, wherein the radio channels are subdivided within a cell to serve a region of the cells. The system determines a first location of the wireless station that comprises one end of a call request and then determines the best serving cell and the best serving region within the cell that serves the location of the wireless station. The system then determines whether a radio channel is available that serves the location of the wireless station and, if a radio channel is not available, the call request is placed in a queue associated with the best serving cell. When a radio channel becomes available in the best serving cell, a determination is made whether the available radio channel serves the best serving region of the first wireless station in the queue for the best serving cell. If the available radio channel serves the best serving region, the radio channel is allocated to the wireless station and the call request is removed from the queue associated with the best serving cell. If the radio channel does not serve the best serving region, the queue is traversed until a call request in the queue is found where the wireless station is located within the region served by the available radio channel. If the wireless station has moved to a second location, the system determines a second best serving cell and a second best serving region of the cell corresponding the the second location of the wireless station. If a radio channel is available to serve the wireless station at the second location, the radio channel is allocated to the wireless station, the call request is removed from the queue for the best serving cell, and the call is completed. If a radio channel is not available to serve the wireless station at the second location, the call request is moved to a queue for the second best serving cell.

A method in accordance with the invention is used in a wireless communication system. In this method, an origination request is sent to a wireless communication system from a mobile station in response to entry of a directory number at the mobile station. Additionally, in response to a message from the wireless communication system, the mobile station produces a signal indicating that the origination request has been placed in a queue, and the mobile station sends an acknowledgement message to the wireless communication system.

BRIEF DESCRIPTION OF THE DRAWING

A more complete understanding of the invention may be obtained from a consideration of the following description in conjunction with the drawing, in which.

DETAILED DESCRIPTION

Figure 1:
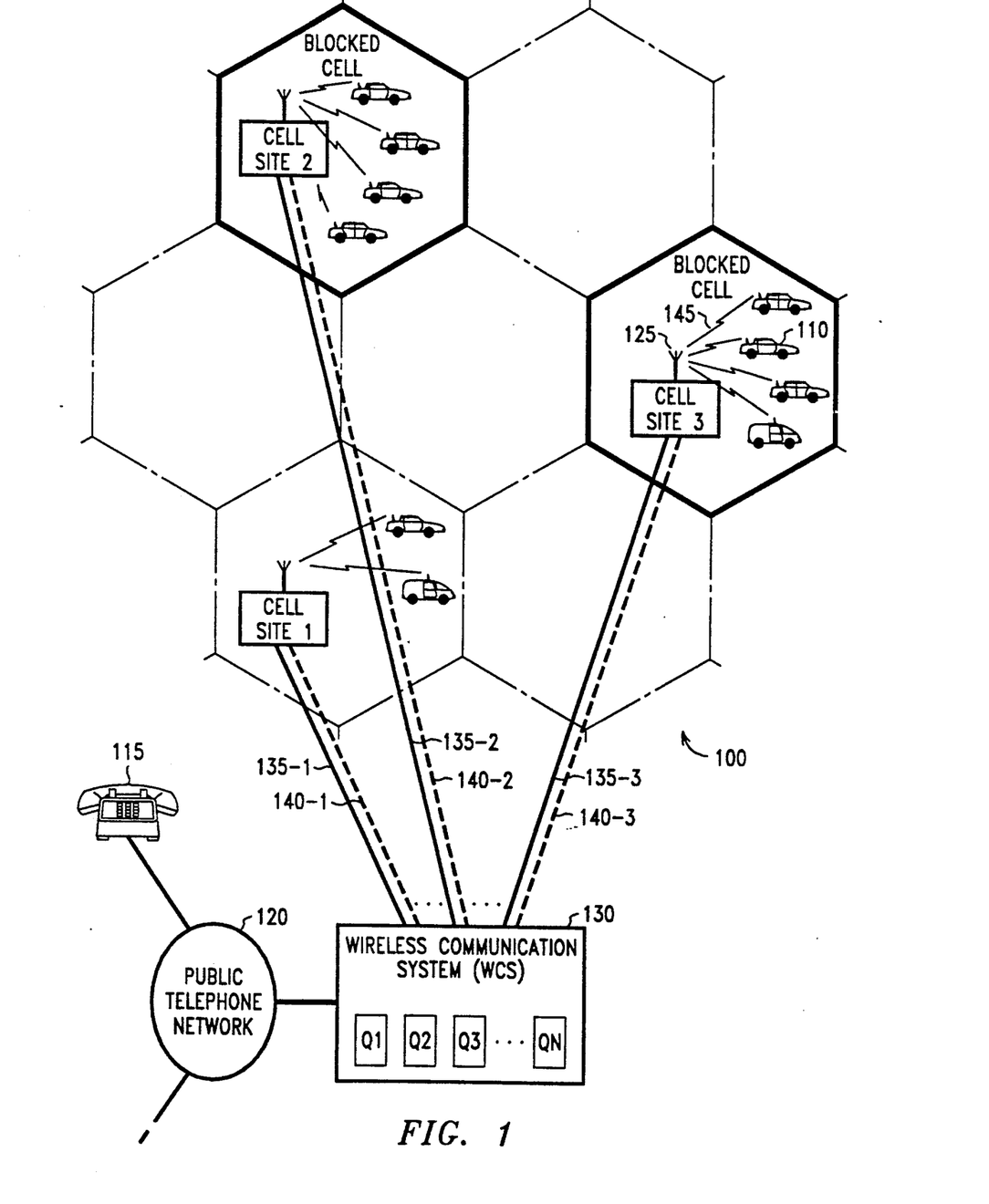
FIG. 1 is a block diagram illustrating the principles of this invention in the context of a wireless mobile communication system.

FIG. 1 shows a simplified block diagram of a wireless telecommunications system 100 illustrating the principles of this invention. This invention will be described with reference to a particular example where mobile station 110 makes a call to telephone 115, connected to public telephone network 120. Mobile station 110 is, in this example, a cellular car telephone; however, mobile station 110 may also be a hand-held cellular telephone or any other digital or analog wireless communication device (such as a wireless fax machine) that uses a wireless communications system. The user enters the directory number of telephone 115 into mobile station 110, and presses the "send" button. Mobile station 110 sends origination messages by radio transmission. The origination message is received by wireless communication system 100 at an antenna 125 associated with a cell site 3 within the wireless communication system 100. For purposes of illustration, wireless communications system 100 comprises an AT&T Autoplex ® System 1000. Each cell site includes an AT&T Autoplex Series 2 Intelligent Base Station 2000. Mobile telecommunications switching systems in general are described in Warty, et al., U.S. Pat. No. 4,827,499, issued May 2, 1989, to AT&T, and Joel, Jr., U.S. Pat. No. 3,663,762, issued May 16, 1972 to AT&T.

Wireless communication system 100 comprises a plurality of cells connected to a wireless communication system 130 via data links 135 1-3 for exchanging messages and communication path trunks 140 1-3. Wireless communications system 130 (WCS) is, in the preferred embodiment, a distributed processing cellular telecommunications switching system. All processing in this specific example is described as taking place at the WCS 130. The WCS 130 may be a distributed processing system, as described in Warty, et al., U.S. Pat. No. 4,827,299, as cited above. Processing is not limited to the WCS or the modules of the WCS, and could be performed in any part of wireless communication system 100. For example, processing may take place at each of the cell sites, with all of the cell sites communicating via data links 135.

WCS 130 determines the best serving cell for mobile station 110 by sending a location request to all cell sites. In this example, the best serving cell is cell site 3. After determining the best serving cell, WCS 130 attempts to allocate mobile call path resources, including a communication path trunk 140 and a radio channel 145 that connects the cell site 3 to mobile station 110. Radio channels 145 may be omnidirectional within a cell area, that is, they radiate in all directions within a cell, or, as is common in urban areas, may be directional, serving only a portion or sector of a cell.

The wireless call path resources allocated by this exemplary method are radio channels. Continuing with the particular example, assume that all of the radio channels 135 are unavailable in cell site 3. In the prior art, when a call path resource in available, a reorder message is sent to mobile station 110. According to the exemplary method of this invention, WCS 130 determines if mobile station 110 has a priority status. Each time a call is placed, a record associated with the mobile station is checked to determine the features that the mobile station may use. One of the features according to this invention is a priority status or a permission to use this feature. If mobile station 110 has a priority status, then WCS 130 determines if there is an available entry in a queue Q3 which queues priority mobile station call requests for cell site 3. If there is an available queue entry in queue Q3, then WCS 130 places mobile station 110 identification in queue Q3, and sends a forced release message to mobile station 110.

While mobile station 110 is in the queue, WCS 130 periodically pages mobile station 110 by sending an alert signal message through all cells. Mobile station 110 is paged to alert the user that the call request is queued and to determine if mobile station 110 has moved into an adjacent cell or, alternatively, is not in service. Mobile station 110 may not be in service because, for example, it has moved out of the cellular service region or has been turned off. If mobile station 110 does not return an acknowledgement message within a predetermined time, WCS 130 assumes that mobile station 110 is not in service and WCS 130 removes the mobile station identification from queue Q3.

If mobile station 110 acknowledges the page message, WCS 130 determines which cell received the acknowledgement. If the acknowledgement message was received at the original cell, then WSC 130 does nothing.

Eventually, a radio channel becomes available for cell site 3. When a radio channel becomes available in cell site 3, the first entry in queue Q3 is assigned to that radio channel. For example, if mobile station 110 is the first entry in queue Q3, mobile station 110 is assigned the available radio channel and the origination request is completed. However, if the radio channel is directional and not suitable for the location of mobile station 110 in cell site 3, then the first mobile station in queue Q3 within the coverage area for the radio channel is assigned to the available channel. If none of the queued mobile stations are within the coverage area of the directional radio channel, then the radio channel is free for general allocation.

In the context of FIG. 1, if mobile station 110 has moved, for example, into cell 1, the page acknowledgement message is received through cell site 1. First, assume that cell site 1 has radio channels available. WCS 130 allocates a radio channel and sends a communication channel allocation message to mobile station 110. Mobile station 110 tunes to the frequency of the communication channel and sends a confirmation message back to the WCS 130. WCS 130 then removes mobile station 110 from queue Q3.

Alternatively, if mobile station 110 acknowledges the page message from cell 2, then WCS 130 determines if there are available call path resources in cell site 2. Cell site 2, for example, does not have available radio channels. WCS 130 removes mobile station 110 from queue Q3 and places it in a queue for call path resources for cell site 2, which is queue Q2.

Figure 2:
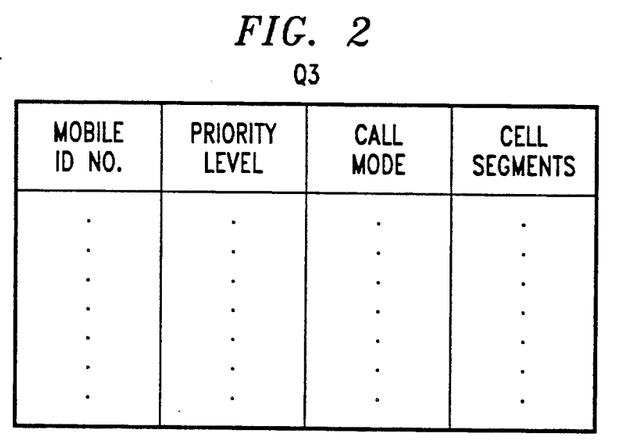
FIG. 2 is an exemplary data structure layout for data queue Q3 in the wireless system of FIG. 1.

FIG. 2 shows a data structure layout of a queue for call path resources as shown at Q1-Q3 in FIG. 1. The first field in the queue contains the mobile station's identification number. The second field contains a priority level associated with the mobile station. There may be only two priority levels, one indicating that the mobile station may use the priority feature and the other indicating that the mobile station may not use the priority feature. Alternatively, there may be a range of priority levels, wherein the lowest level may not use the priority feature and the higher levels may preempt lower level mobile stations. The highest level may be assigned to, for example, police, fire or national security mobile stations. In this case, when resources become available, a mobile station with the highest priority can be served. If the queue for a cell is full, a mobile station may preempt a mobile station with a lower priority level. The third field indicates the call mode of the mobile station, that is, whether the mobile station is configured to use analog, digital or dual mode wireless facilities as known in the art. The next field lists the three best serving sectors for the mobile station, in rank order, if the radio channels that serve the cell are directional.

Figure 3:
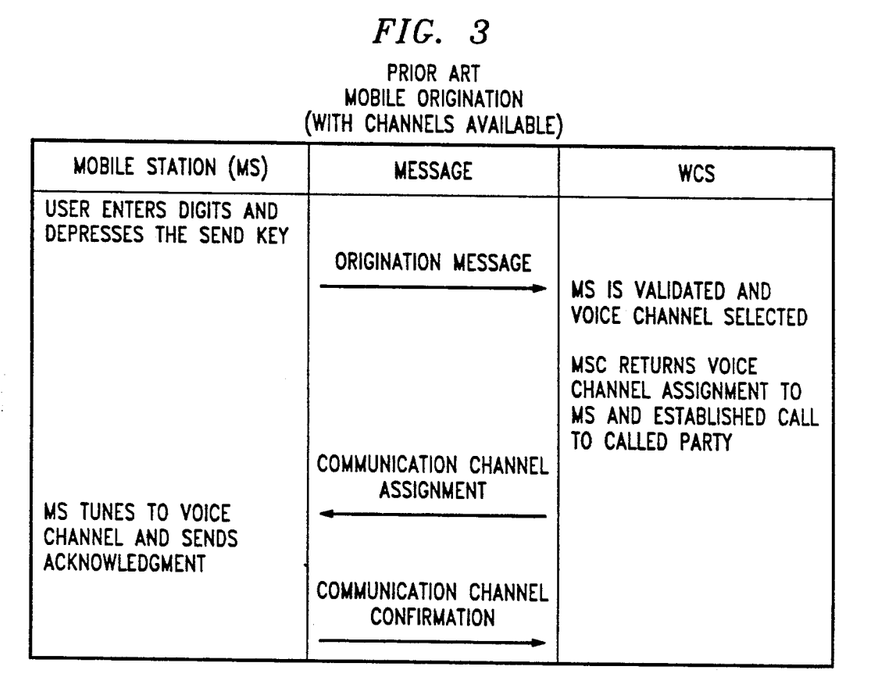
FIG. 3 is a diagram of a message sequence used in the prior art to set up a wireless telephone call in the system of FIG. 1 when channels are available.

Turning now to FIG. 3, a message sequence diagram for a prior art mobile origination request is shown, when radio channels are available. The user enters a directory number into the mobile station and depresses the SEND key. An origination message is transmitted from the mobile station to cell site 3, and cell site 3 forwards the origination message to the WCS 130. WCS 130 performs a data base look up to determine if the mobile station 110 is a valid user of wireless telecommunications system 100. If mobile station 110 is a valid user of wireless telecommunications system 100, WCS 130 then allocates an available radio channel. WCS 130 returns a communication channel assignment message to mobile station 110, assigning a radio channel frequency, and establishes a call to telephone 115 connected through public telephone network 130, as known in the art. In response to the radio channel assignment message, mobile station 110 tunes to the radio channel frequency and sends a communication channel confirmation message to WCS 130.

Figure 4:
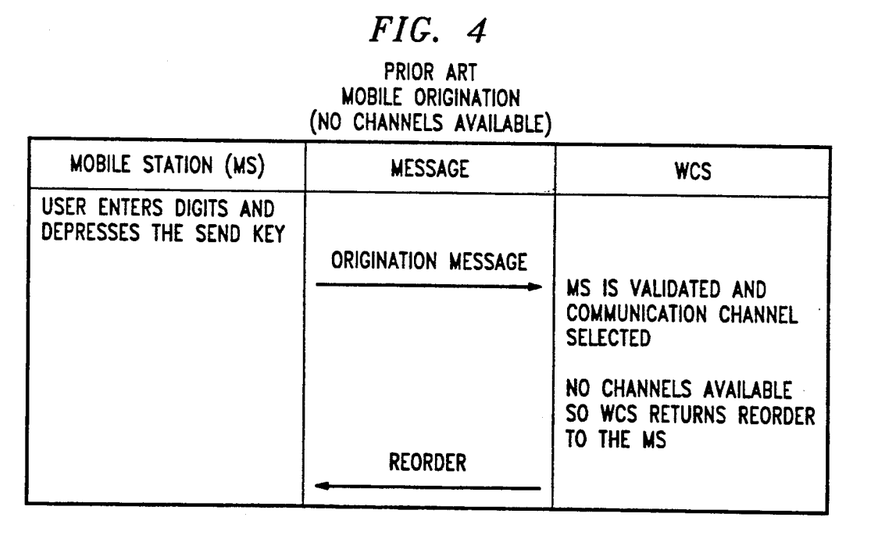
FIG. 4 is a diagram of a message sequence used in the prior art to set up a wireless telephone call when no channels are available.

Turning now to FIG. 4, the prior art mobile origination message sequence diagram when no radio channels are available is shown. The user enters the digits of the directory number for telephone 115 into mobile station 110. The user then presses the SEND key which causes mobile station 110 to send an origination message to the cell site 3. Cell site 3 forwards the origination message to WCS 130. WCS 130 determines that mobile station 110 is a valid user of wireless telecommunications system 100, and attempts to allocate cellular resources. In this case, all radio channels for cell site 3 are allocated to other mobile stations. WCS 130 sends a reorder message to mobile station 110.

Figure 5:
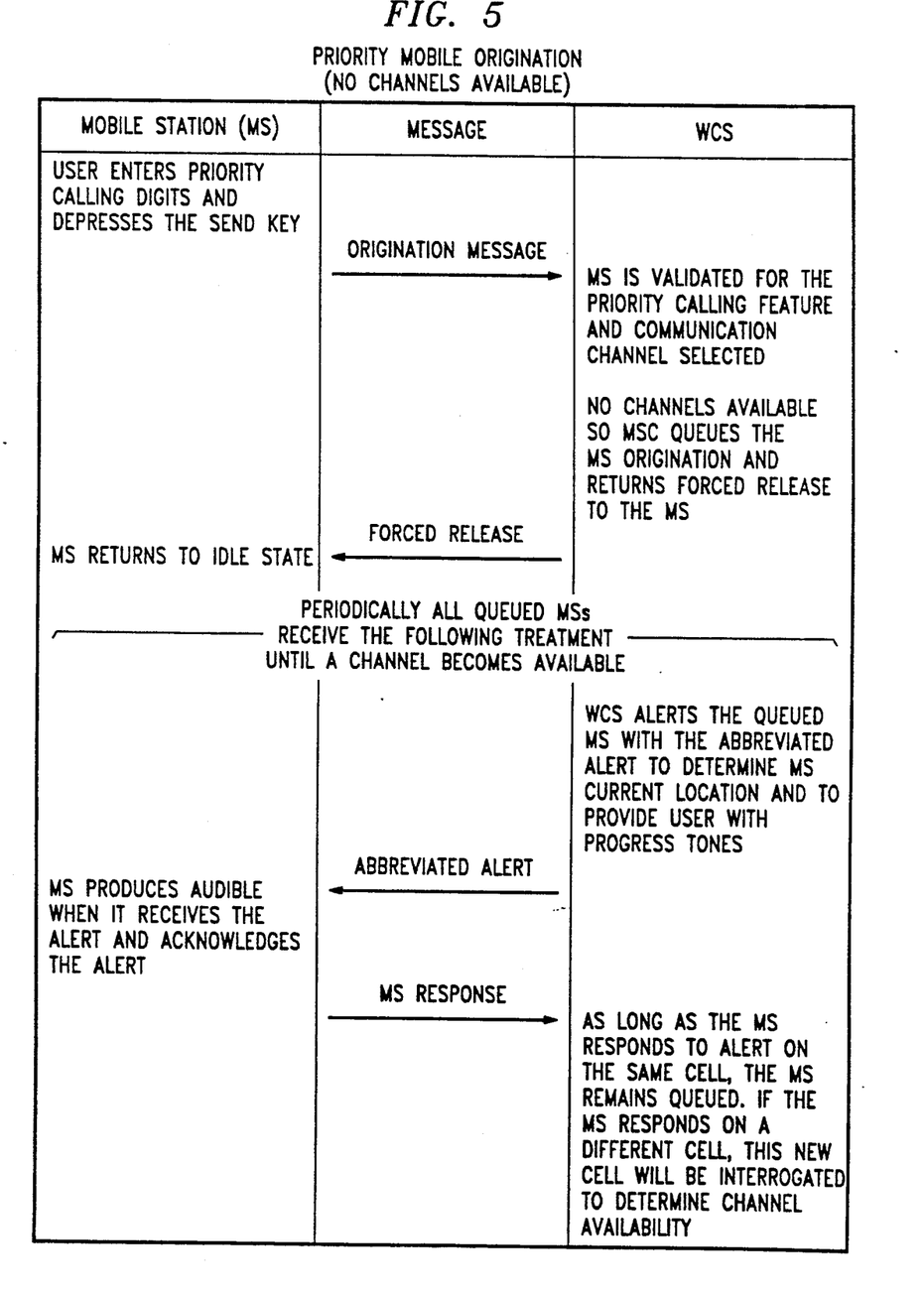
FIG. 5 is a diagram of a message sequence according to the exemplary method of this invention in the context of the system of FIG. 1.

Turning now to FIG. 5, a message sequence diagram according to an exemplary method of this invention is shown. In this exemplary method, the user enters a feature code and then the digits of the directory number of telephone 115, and presses the SEND key. The feature code may be *XX, wherein X represents any number from zero to nine. This feature code is illustrative and could also be implemented as a special button on the mobile station or any other form of feature identifier. Alternatively, the system could queue every call for a priority mobile station automatically whenever the priority mobile station attempts to place a call when resources are blocked.

When the user presses the SEND key, mobile station 110 sends an origination request message to WCS 130. The origination request message includes the feature code, the directory number, and mobile station identification. WCS 130 verifies that mobile station 110 is a valid user of wireless telecommunications system 100 and a valid user of the priority feature.

Next, WCS 130 attempts to allocate call path resources to connect mobile station 110 to public telephone network 120. In this example, no radio channels are available to connect mobile station 110 to cell site 3. Therefore, WSC 130 queues mobile station 110 in a queue Q3 for the origination cell, cell 3. There is one queue per cell site, with 15 entries per queue in this exemplary method.

Alternatively, there may be a plurality of queues for each cell site, with a priority level assigned to each queue. In this manner, all highest priority mobile stations may be placed in one queue and served first. All mobile stations of the next priority are served subsequently to the highest priority, etc. The number of entries per queue is office dependent, that is, dependent upon the number of mobile stations with this priority queuing feature that generally originate calls in the service region.

Mobile station 110 sent the origination request from cell site 3, and therefore WCS 130 sequentially examines the entries in the queue for call path resources for cell site 3, queue Q3, to determine if a queue entry is available. If a queue entry is available, WCS 130 then examines each queue entry to determine if mobile station 110 is already queued, (which would occur, for example, if mobile station 110 made a second origination request without dequeuing a first origination request). If mobile station 110 is not already queued, mobile station 110 is placed in the queue. If mobile station 110 is found in the queue, then the prior entry is removed and the new request is placed in the queue. This action is based on the assumption that the user of mobile station 110 decided to abandon the first call and place a new call.

WCS 130 next sends a forced release message to mobile station 110. In response to the forced release message, mobile station 110 returns to the idle state.

Continuing with FIG. 5, during the time that mobile station 110 is queued, it is periodically paged to determine the location of mobile station 110 within the cellular telecommunications system 100 and to alert or remind the user of mobile station 110 that an origination request is pending. WCS 130 sends a message through all cell sites to mobile station 110 to give an abbreviated alert signal, for example, "ping-ring." Mobile station 110 receives the abbreviated alert message, produces an audible ping-ring for the user and acknowledges the alert with a message response back to WCS 130.

When WCS 130 receives the acknowledgement message from mobile station 110, WCS 130 determines which cell site received the acknowledgement message. If the response came from the original cell, WCS 130 does nothing. If the mobile station 110 sent the acknowledgement message from a different cell, for example, cell site 1, WCS 130 determines whether call path resources are available for cell site 1. If call path resources are available in cell site 1, WCS 130 removes mobile station 110 from queue Q3 and completes the call. If one of the call path resources is not available in cell site 1, then mobile station 110 is removed from queue Q3 and placed in an entry in queue 1.

Figure 6:
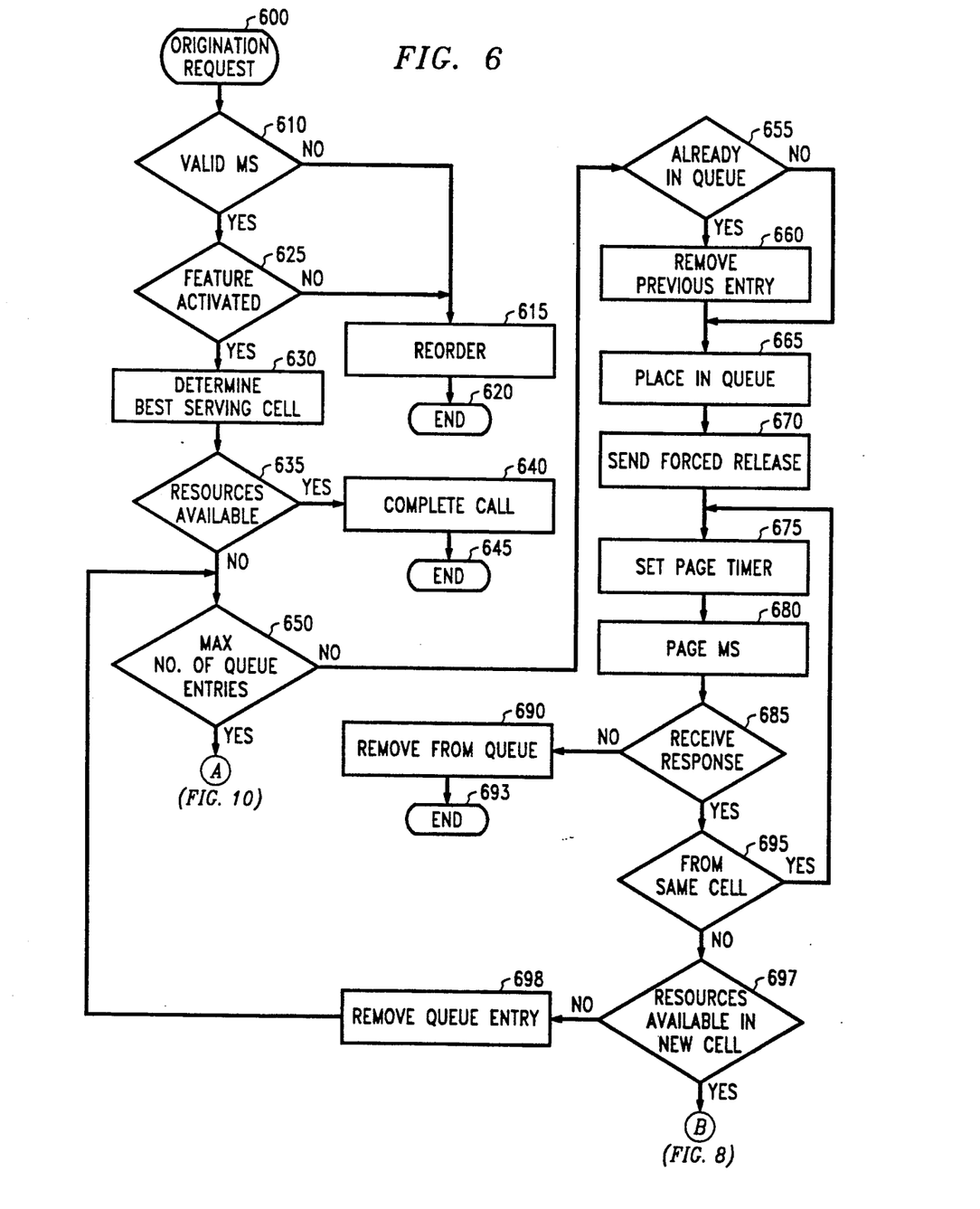
FIG. 6 is a flow chart describing the processing of the message sequence of FIG. 4.

FIG. 6 shows a flow chart of the WCS for the message sequence of FIG. 5. Processing begins in circle 600, wherein an origination request message is received. Processing proceeds to decision diamond 610. In decision diamond 610, the identification of the mobile station is checked to determine if the mobile station is a valid user of the wireless communication system. If the mobile station is not a valid user of this wireless communication system, a reorder message is returned to the mobile station in action block 615. Processing proceeds to circle 620, where processing ends.

If the mobile station is found to be a valid user of the wireless telecommunications system in decision diamond 610, then processing proceeds to decision diamond 625. In decision diamond 625, a check is made to determine if the mobile station is allowed to use the priority feature. If the mobile station is not permitted to use the priority feature, then processing proceeds in action block 615, where a reorder message is sent to the mobile station. Processing proceeds to circle 620 when processing ends.

If the mobile station is permitted to use the priority feature in decision diamond 625, then processing proceeds to action block 630, where the best serving cell is determined. Processing proceeds to decision diamond 635 to determine if cellular call path resources are available to complete the call in the best serving cell. If resources are available in decision diamond 635, then in action block 640, the call is completed and processing continues to end circle 645.

If resources are not available as determined in decision diamond 635, then processing proceeds to decision diamond 650. In decision diamond 650, a test is made whether a queue entry is available in the queue for call path resources for the best serving cell. If a queue entry is not available, processing proceeds to connector A. If a queue entry is available, processing proceeds to decision diamond 655. In decision diamond 655, the mobile station is compared to the mobile stations that are already in the queue, to determine whether the mobile station has a previous queue entry. If the mobile station has a previous queue entry, then processing proceeds to action block 660 where the previous queue entry is removed.

Processing proceeds to action block 665 where the mobile station is placed in the queue in first-in, first-out order. Processing proceeds to action block 670 where the mobile station is sent a forced release message.

From action block 670, processing proceeds to action block 675 where a paging timer is set. When the paging timer times out in action block 675, processing proceeds to action block 680 where an abbreviated alert message is sent to the mobile station. Processing proceeds to decision diamond 685 to determine whether the mobile station acknowledged the paging message. If the mobile station did not acknowledge the paging message in decision diamond 685, then processing proceeds to action block 690 where the mobile station is removed from the queue. Processing continues to end circle 693.

If the mobile station responded to the paging message, as determined in decision diamond 685, then processing proceeds to decision diamond 695 where the cell from which the response was received is compared to the cell originally queued for. If, in decision diamond 695, the response came from a different cell, then processing proceeds to decision diamond 697. In decision diamond 697, WCS determines if call path resources are available in the new cell. If call path resources are available, then processing proceeds to connector B. If call path resources are not available in the new cell, then processing proceeds to action block 698, where the mobile system is removed from the first queue. Processing continues to decision diamond 650, where a test is made to determine if the queue for call path resources for the new cell has available entries. Processing then continues as described above. If it is determined that the response message came from the same cell in decision diamond 695, then processing loops back to action block 675, where the paging timer is again set.

Figure 7:
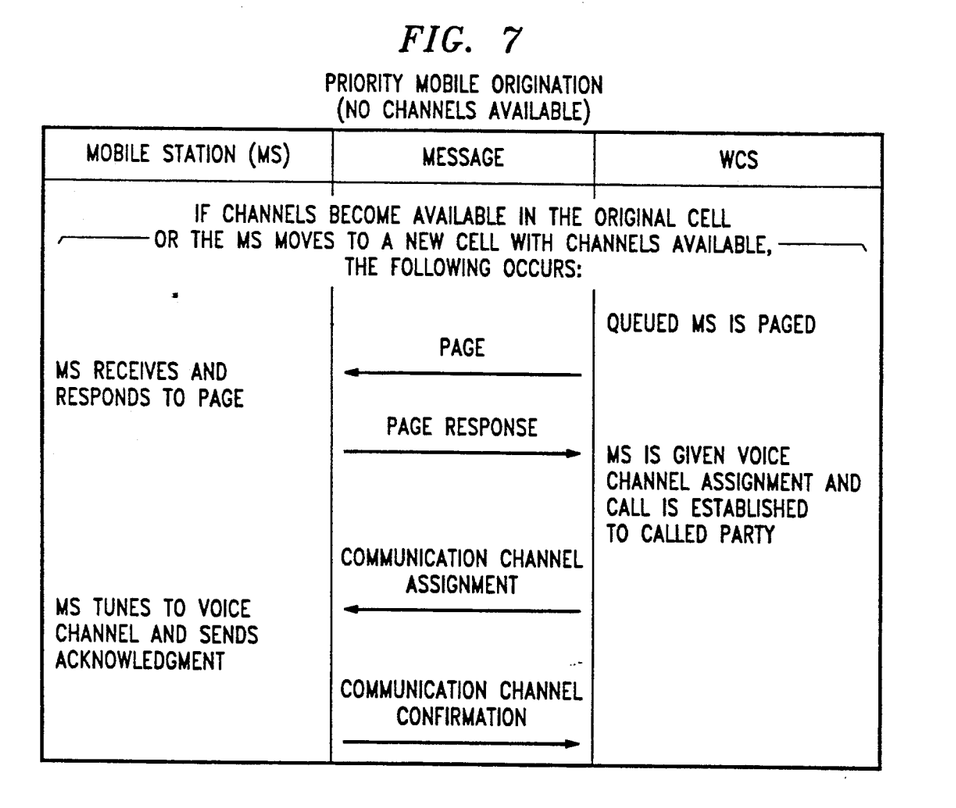
FIG. 7 is a diagram of a message sequence according to the exemplary method of this invention when channels become available in a cell or the mobile station moves into a cell with channels available in the system of FIG. 1.

FIG. 7 describes the sequence of messages exchanged when call path resources become available in a cell, when call requests are queued. When call path resources (for example, radio channels) are available in cell site 3, WCS 130 determines the next entry in queue Q3. For example, if mobile station 110 is the next entry in queue Q3, WCS 130 removes mobile station 110 from queue Q3 and establishes a call to telephone 115. A radio channel assignment message is sent to mobile station 110, including the frequency of the radio channel assigned. Mobile station 110 tunes to the assigned radio frequency and sends an acknowledgement message to WCS 130.

Figure 8:
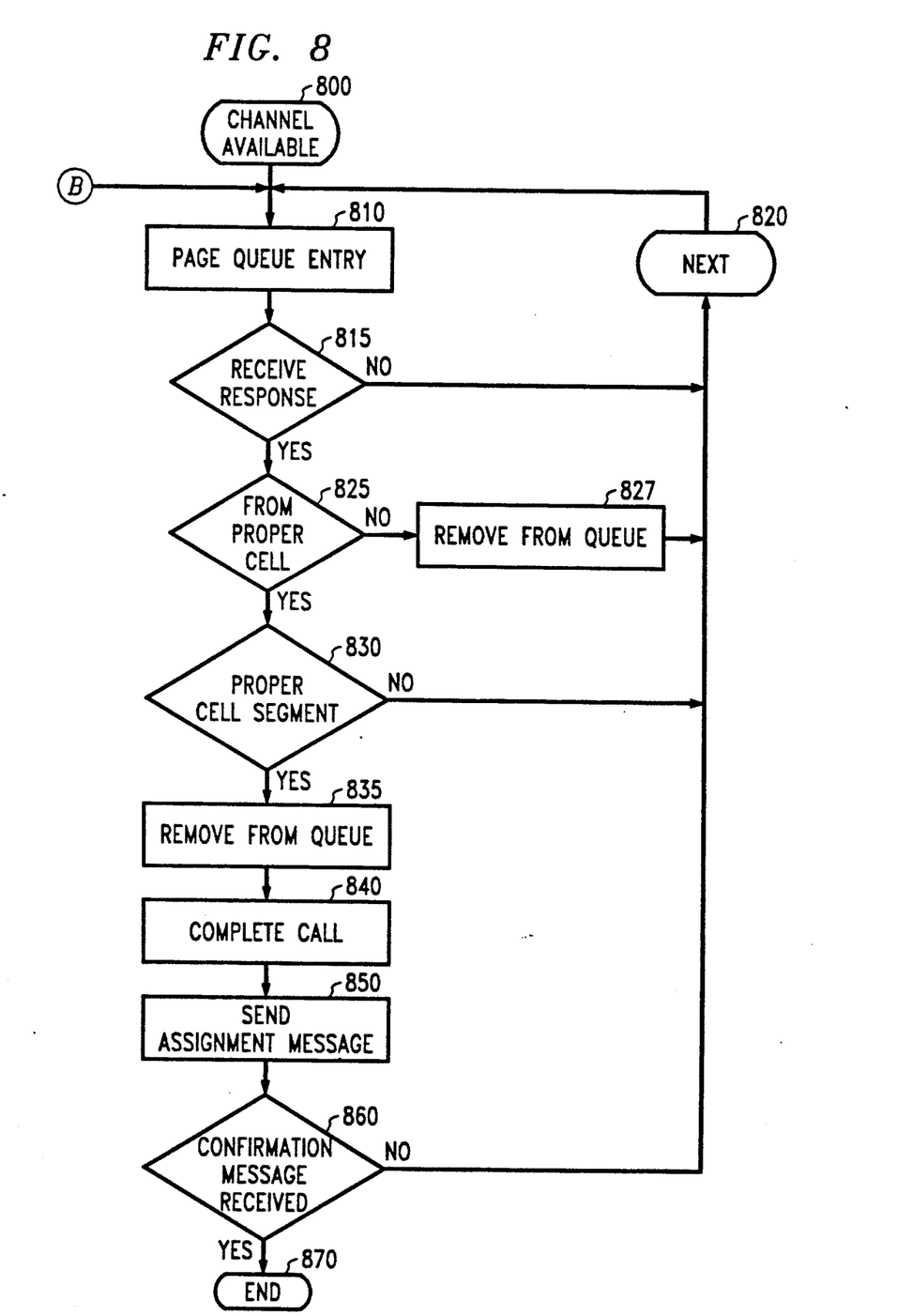
FIG. 8 is a flow chart describing the processing of the message sequence of FIG. 7.

The flow chart of FIG. 8 describes the processing associated with the message sequence of FIG. 7. Processing enters at 800 and connector B. Processing proceeds to action block 810 where the first entry in the queue is paged, as above. Processing proceeds to decision diamond 815 wherein a test is made whether a response was received from the mobile station. If no response was received from the mobile station then processing continues to action block 820 where a next entry in the queue is examined, and processing loops to action block 810. If a response message were received in decision diamond 815, then processing proceeds to decision diamond 825 where the cell in which the response message was received is compared to the cell in which the resource is available. If the cells are not the same, then the mobile station is removed from the queue in action block 825 and processing loops to action block 820, as above. If the response were received in the cell for which the resources are available in decision diamond 825, then processing proceeds to decision diamond 830.

If the resource is a directional radio channel, then in decision diamond 830 a test is made if the location of the mobile station is properly aligned with the segment of coverage of the available channel. If the location of the mobile station is not appropriate for the channel available, then processing loops to action block 820, as above. If the channel serves the location of the mobile station, then processing proceeds to action block 835 where the mobile station is removed from the queue for the cell. Processing proceeds to action block 840 where the call is completed.

Processing proceeds to action block 850 where the mobile station is sent a channel assignment message. Processing proceeds to decision diamond 816 where processing waits for a confirmation message from the mobile station. If the confirmation message is not received within a predetermined time then processing loops to action block 820, as above. If the confirmation message is received in decision diamond 860, then processing proceeds to the end circle 870.

Figure 9:
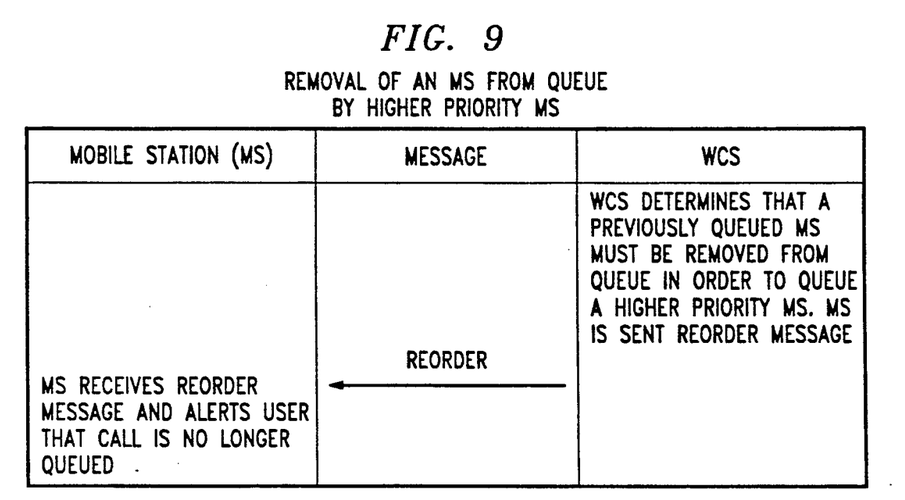
FIG. 9 is a diagram of a message sequence according the the exemplary method of this invention showing the removal of an entry in a queue by a higher priority mobile station in the system of FIG. 1.

It is possible in this exemplary method for certain mobile stations to have higher priorities than other mobile stations subscribing to this feature. Turning now to FIG. 9, the sequence of messages when a mobile station is removed from the queue by a higher priority mobile station is shown. The higher priority mobile station could be, for example, one assigned to national security, local safety for fire, police or civil defense. When WCS 130 determines that the requesting mobile station is permitted to use the priority calling feature, WCS 130 also determines a priority level for the requesting mobile station.

If WCS 130 then determines that there are no available entries in the queue, then the WCS 130 determines if there are any queued mobile stations with a lower priority level than the currently requesting mobile station. If WCS 130 determines that a previously queued mobile station has a lower priority, then the lower priority mobile station is removed from the queue and the higher priority requesting mobile station is placed into the queue. The mobile station removed from the queue is sent a reorder message.

Figure 10:
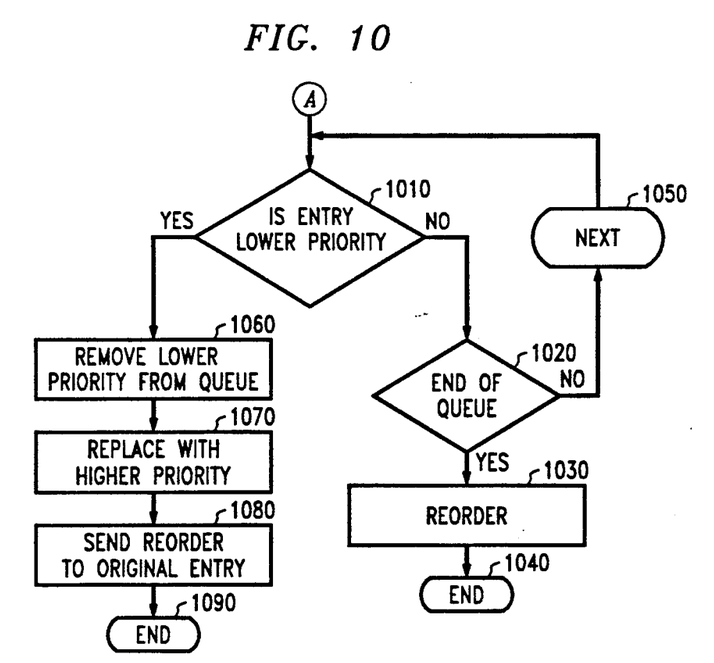
FIG. 10 is a flow chart illustrating the processing performed to produce the message sequence of FIG. 9.

Turning now to FIG. 10, a flow chart describing the processing of the WCS in FIG. 9 is shown. Processing enters through connector A. Processing proceeds to decision diamond 1010 where the first entry in the queue is checked to determine if the priority of the queue entry is less than the priority of the mobile station. If the priority of the queue entry is not less than the priority of the mobile station, then processing proceeds to decision diamond 1020.

In decision diamond 1020, a test is made to determine if the end of the queue has been reached. If the end of the queue has been reached, then the mobile station has a lower priority than all of the entries in the queue. Therefore, processing proceeds to action block 1030 where a reorder message is sent to the mobile station, and processing ends at circle 1040.

If the end of the queue has not been reached, then processing proceeds to action block 1050 where the next queue entry is examined, and processing loops to decision diamond 1010.

If in decision diamond 1010 an entry with a lower priority than the mobile station is found, then processing proceeds to action block 1060 where the lower priority entry is removed from the queue. Processing proceeds to action block 1070 where the mobile station with higher priority is placed in the queue entry. Processing continues to action block 1080 where a recorder message is sent to the mobile station whose queue entry was removed. Processing ends at circle 1090.

Figure 11:
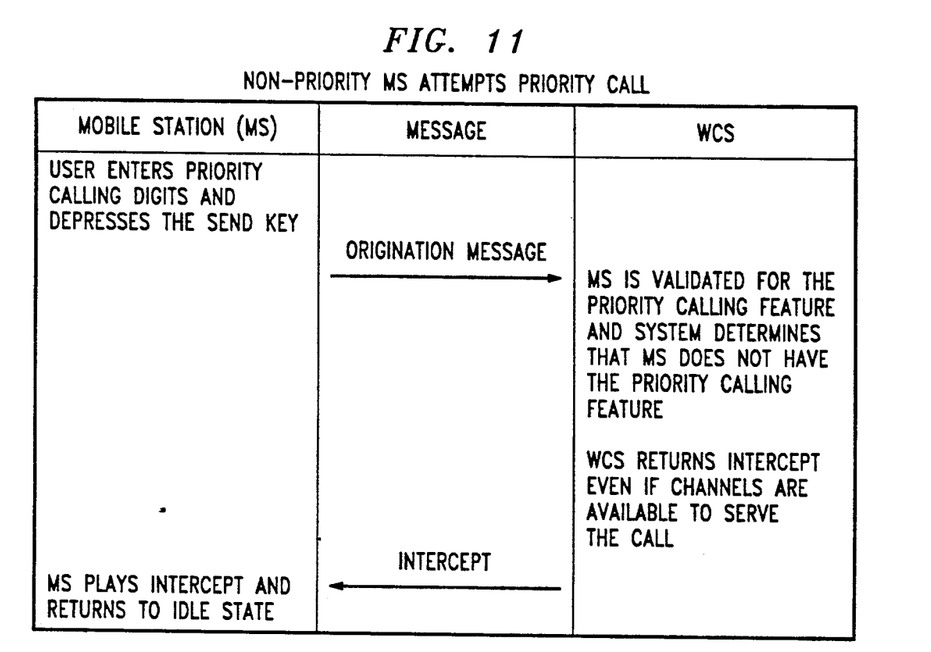
FIG. 11 is a diagram of the message sequence according to the exemplary method of this invention when a non-priority mobile station attempts to place an entry in a queue in the system of FIG. 1.

Turning now to FIG. 11, the sequence of messages when a non-priority mobile station attempts to use this feature is shown. In this exemplary method, a non-priority user may enter the feature code and a directory number, which is sent to WCS 130 as an origination message. WCS 130 determines whether the mobile station is a permitted to use the priority feature. If WCS 130 determines that the mobile station is not permitted to use the priority feature, WCS 130 sends an intercept message to the requesting mobile station, even if call path resources are available. When the mobile station receives the intercept message, it produces an intercept tone and returns to the idle state.

Figure 12:
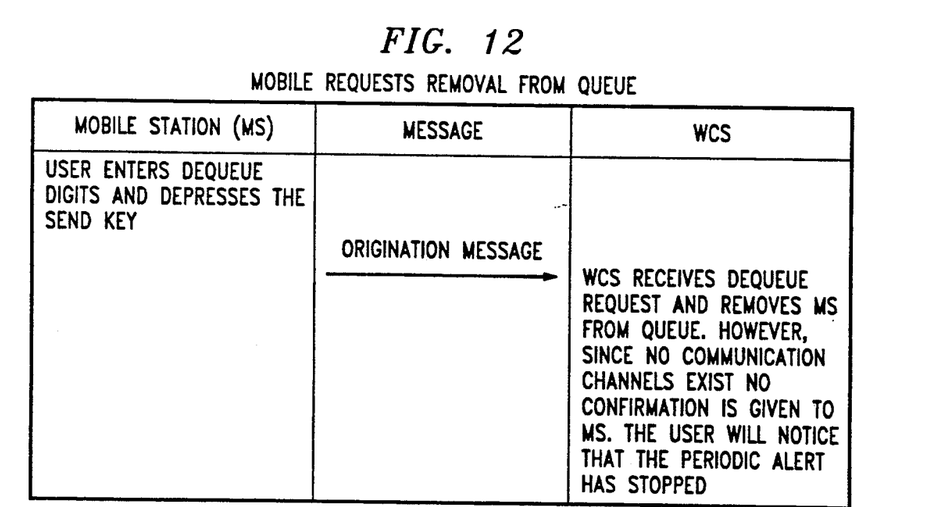
FIG. 12 is a diagram of the message sequence according to the exemplary method of this invention for removal of an entry in a queue in the system of FIG. 1.

Turning now to FIG. 12, a message sequence diagram for removal of a mobile station from the queue is shown. In the exemplary embodiment, the user of mobile station 110 enters a dequeue digits sequence (for example, a feature code, *XX, without a directory number may be used) and depresses the SEND key. The mobile station sends an origination message to the WCS. The WCS receives the origination message and recognizes the dequeue request because the feature code is not followed by a directory number. In response to the dequeue request, WCS 130 removes the mobile station from the queue. The user notices that the periodic alert has stopped and the mobile station is idle.

It is to be understood that the above-described embodiment is merely illustrative of the principles of the invention and that many variations may be devised by those skilled in the art without departing from the spirit and scope of the invention. For example, incoming calls to a mobile station from the public switch network may be queued when there are no call path resources available in the cell in which the mobile station is located. A check is made to determine if the mobile station is currently busy before the incoming call is placed in the queue. It is, therefore, intended that such variations be included within the scope of the appended claims.

We claim:

1. In a wireless telecommunications system including a plurality of cells, each of said cells using a plurality of radio channels for communication, a method for establishing a call request queue comprising the steps of:
   in response to a call request from a mobile station in a first one of said cells and the unavailability of radio channels in said first cell, said wireless telecommunications system placing said call request in a queue for said first cell,
   periodically determining a location of said mobile station, and
   in response to movement of said mobile station from said first cell to a second one of said cells while said call request is queued in said queue for said first cell and there exists an unavailability of radio channels in said second cell, said wireless telecommunications system placing said call request in a queue for said second cell.

2. A method according to claim 1 further comprising: removing said call request from said queue for said first cell.

3. A method according to claim 1, wherein said determining of location comprises said wireless telecommunications system periodically sending a location update request signal to said mobile station, and said mobile station sending an acknowledgement message to said wireless telecommunications system in response to said signal, before a call is established.

4. A method according to claim 3, wherein each of said cells comprises cell site means for receiving radio signals, said method further comprising:
   determining movement of said mobile station from said first cell to said second cell, said determining movement comprising
   said cell site means of said second cell receiving a radio signal comprising said acknowledgement message.

5. A method according to claim 1, wherein said mobile station has an associated priority status, and said step of placing said call request in said queue for said first cell includes placing said call request in said queue for said first cell such that said call request is accessible in priority status order.

6. A method according to claim 1, wherein said mobile station has an associated priority status, said method further comprising:
   after receiving said call request from said mobile station, determining whether entries in said queue for said first cell are available,
   in response to determining that no entries in said queue for said first cell are available, comparing said priority status of said mobile station to the priority status of other mobile stations with call requests in said queue for said first cell, and
   replacing a call request from one of said other mobile stations with said call request from said requesting mobile station when said comparing indicates that said requesting mobile station has a higher priority status than said one of said other mobile stations.

7. A method according to claim 1 further comprising:
   after placing said call request in said queue for said first cell, when a radio channel becomes available in said first cell, allocating said radio channel to a call request in said queue for said first cell.

8. A method according to claim 1 further comprising:
   after placing said call request in said queue for said second cell, when a radio channel becomes available in said second cell, allocating said radio channel to a call request in said queue for said second cell.

9. A method according to claim 1 wherein the plurality of radio channels serve a region of said first cell, said method further comprising:
   after placing said call request in said queue for said first cell, when a radio channel becomes available in said first cell, determining the region of said first cell where said mobile station is located and
   determining whether the service region of said available radio channel is the same as the region of said first cell where said mobile station is located and in response to determining that the service region and the region where said mobile station is located are the same, allocating said available radio channel to said mobile station, completing a call connection with said mobile station for said call request, and removing said call request from said queue for said first cell.

10. The method of claim 9 further comprising:

in response to determining that the service region of said available radio channel is different from the region where said mobile station is located, sequentially traversing said queue for said first cell until an entry is reached specifying a region where a mobile station is located that is the same as the service region of said available radio channel.

11. A method according to claim 1 wherein said queue for said first cell comprises a plurality of queues, wherein the step of placing said call request in said queue for said first cell comprises:
  determining a priority associated with said mobile station, and
  in response to said priority determination, placing said call request in one of said plurality of queues for said first call that corresponds to said determined priority.

12. A wireless telecommunications system for serving a plurality of cells, each of said cells using a plurality of radio channels for communication, said system comprising:
  memory means for storing a first queue for a first one of said cells and a second queue for a second one of said cells,
  means responsive to a call request from a mobile station in said first cell and the unavailability of radio channels in said first cell, for placing said call request in said first queue, and
  means responsive to movement of said mobile station from said first cell to said second cell and the unavailability of radio channels in said second cell, for placing said call request in said second queue.

13. A system according to claim 12, further comprising:
  means responsive to movement of said mobile station from said first cell for removing said call request from said first queue.

14. A system according to claim 12, further comprising:
  a plurality of cell site means each associated with one of said cells for transmitting and receiving radio signals within the associated cell.

15. A system according to claim 14, further comprising:
  means responsive to receipt, by said cell site associated with said second cell, of a radio signal comprising an acknowledgement message for determining movement of said mobile station from said first cell to said second cell.

16. A system according to claim 12 further comprising
  means responsive to said call request in said first queue and a determination of availability of a radio channel in said first cell for allocating said available radio channel to a call request in said first queue.

17. A method of allocating wireless telecommunications call path resources comprising the steps of:
  determining a first location of a wireless station comprising one end of a call;
  determining whether call path resources are available to effect a connection with said wireless station at said determined first location;
  if call path resources are not available, placing said call in a first queue associated with said first location;
  after placing said call in said first queue, determining whether said wireless station has moved to a second location having an associated second queue;
  if said wireless station has moved to said second location, determining whether call path resources are available to effect a connection with said wireless station at said second location;
  if call path resources are available in said second location, completing said call;
  if call path resources are not available in said second location, removing said call from said first queue and placing said call in said second queue.

18. A method of claim 17 wherein said call path resources comprise radio channels.

19. A method of allocating wireless telecommunications call path resources in response to a call request from a wireless station at a first location comprising the steps of:
  determining whether call path resources are available to effect a connection between a wireless telecommunications system and said wireless station,
  if call path resources are not available, determining a priority status associated with said wireless station,
  placing said call request in a queue associated with said first location in priority order based on said determined priority status;
  after placing said call in said first queue, determining whether said wireless station has moved to a second location having an associated second queue;
  if said wireless station has moved to said second location, determining whether call path resources are available to effect a connection with said wireless station at said second location and removing said call request from said queue associated with said first location;
  if call path resources are available, completing said call;
  if call path resources are not available, placing said call request in a queue associated with said second location in priority order based on said determined priority status.

20. The method of claim 19 wherein said queue associated with said first location includes a predefined number of entries and said method includes the steps of:
  after said step of determining said priority status, determining whether the number of entries in said queue associated with said first location is equal to said predefined number;
  if the number of entries in said queue associated with said first location is equal to said predefined number, determining if one of said entries in said queue associated with said first location has a priority status less than said determined priority status;
  if one of said entries in said queue associated with said first location has a priority status less than said determined priority status, removing said one of said entries from said queue associated with said first location and replacing said one of said entries with said call request.

21. In a wireless telecommunications system comprising a plurality of cells, each of said plurality of cells using a plurality of radio channels for communication, said plurality of radio channels being subdivided to serve a region of said cell, a method for establishing a call request queue comprising the steps of:
  determining a first location of a wireless station comprising one end of a call request;
  determining a best serving cell and a region of said cell corresponding to said first location;
  if a radio channel is not available to serve said wireless station in said first location, placing said call request in a queue associated with said best serving cell;

after placing said call in said queue associated with said best serving cell, determining whether said wireless station has moved to a second location having an associated second queue;

if said wireless station has moved to a second location, determining a second best serving cell and a region of said cell serving said second location;

if a radio channel is available to serve said wireless station at said second location, allocating said radio channel and completing said call;

if a radio channel is not available to serve said wireless station at said second location, placing said call request in a queue for said second best serving cell.

22. The method of claim 21 further including the steps of:

when a radio channel becomes available in said best serving cell, determining whether said radio channel serves said region of said cell;

in response to determining that said radio channel serves said region of said cell, allocating said radio channel to said mobile station and completing said call.

23. The method of claim 21 further including the steps of:

when a radio channel becomes available in said best serving cell, determining whether said radio channel serves said region of said cell;

in response to determining that said radio channel does not serve said region of said cell, determining whether said radio channel serves a next call request in said queue for said best serving cell.

24. In a wireless telecommunication system, a method of effecting a connection between a wireless station and a second station, said second station being connected to a telephone switching network connected to said wireless telecommunication system, said method comprising the steps of:

receiving a request via said telephone switching network for a connection from said second station to said wireless station;

determining a first location of said wireless station;

determining whether call path resources are available in said first location;

if call path resources are not available in said first location, determining a priority of said wireless station, and placing said connection request in a first queue associated with said first location according to said determined priority;

after placing said call in said first queue, determining whether said wireless station has moved to a second location having an associated second queue;

if said wireless station has moved to said second location, determining whether call path resources are available in said second location;

if call path resources are available in said second location, allocating said call path resources, processing said connection request and removing said connection request from said first queue; and if call path resources are not available in said second location, removing said connection request from said first queue and placing said connection request in said second queue according to said determined priority.

25. In a wireless telecommunications system, a method for establishing a call connection comprising the steps of:

in response to a request to establish a call connection with a mobile station as said mobile station changes locations within an area served by said wireless telecommunication system, sequentially placing said request in ones of a plurality of queues if there exists an unavailability of a radio channel of said system to establish said call connection to said mobile station, each of said plurality of queues being associated with a different location within said area and in response to availability of a radio channel to establish said connection to said mobile station and the presence of said request in the one of said queues associated with the location of said mobile station within said area, establishing said connection.

26. A method in accordance with claim 25 where said request is for an outgoing call from said mobile station.

27. A method in accordance with claim 25 where said request is for an incoming call to said mobile station.

28. A method in accordance with claim 25 further comprising:

determining a first location of said mobile station, said first location being associated with a first one of said queues, placing said request in said first queue, after placing said request in said first queue, determining that said mobile station has moved to a second location associated with a second one of said queues, and placing said request in said second queue.

29. A method in accordance with claim 28 further comprising:

after determining that said mobile station has moved to said second location, removing said request from said first queue.

* * * * *